United States Patent
Wijekoon et al.

(10) Patent No.: US 12,549,112 B2
(45) Date of Patent: Feb. 10, 2026

(54) POWER CONVERTER

(71) Applicant: Huawei Digital Power Technologies Co., Ltd., Shenzhen (CN)

(72) Inventors: Piniwan Thiwanka Bandara Wijekoon, Nuremberg (DE); Sebastian Rosado, Nuremberg (DE); Zhaohui Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 167 days.

(21) Appl. No.: 18/489,253

(22) Filed: Oct. 18, 2023

(65) Prior Publication Data
US 2024/0048070 A1 Feb. 8, 2024

Related U.S. Application Data

(63) Continuation of application No. PCT/CN2021/088750, filed on Apr. 21, 2021.

(51) Int. Cl.
*H02M 7/487* (2007.01)
*H02M 1/00* (2007.01)

(52) U.S. Cl.
CPC ......... *H02M 7/487* (2013.01); *H02M 1/0048* (2021.05); *H02M 1/0095* (2021.05)

(58) Field of Classification Search
CPC ... H02M 1/0048; H02M 1/0095; H02M 7/487
See application file for complete search history.

(56) References Cited

U.S. PATENT DOCUMENTS

| | | | |
|---|---|---|---|
| 4,670,828 A | 6/1987 | Shekhawat et al. | |
| 9,172,301 B2* | 10/2015 | Nguyen | H02M 3/155 |
| 10,439,512 B1 | 10/2019 | Mouridsen | |
| 10,778,114 B2 | 9/2020 | Lu et al. | |
| 2011/0193412 A1 | 8/2011 | Lacarnoy | |

FOREIGN PATENT DOCUMENTS

| | | |
|---|---|---|
| CN | 105207510 A1 | 12/2015 |
| CN | 104362878 B | 7/2017 |
| CN | 109546879 A | 3/2019 |

(Continued)

OTHER PUBLICATIONS

Wang et al., "Novel High-Efficiency Three-Level Stacked-Neutral-Point-Clamped Grid-Tied Inverter", IEEE Transactions on Industrial Electronics, IEEE, XP011507038, Sep. 1, 2013, vol. 60, No. 9, pp. 3766-3774 (Year: 2013).*

(Continued)

*Primary Examiner* — Jue Zhang
(74) *Attorney, Agent, or Firm* — Maier & Maier, PLLC

(57) ABSTRACT

A power converter may include: a first terminal, a second terminal and a third terminal, and an AC terminal for coupling an AC voltage; a first controllable unidirectional switching circuit; a second controllable unidirectional switching circuit; a controllable bidirectional switching circuit; a first diode connected in a forward current direction between the third terminal and the first controllable unidirectional switching circuit; and a second diode connected in a forward current direction between the second controllable unidirectional switching circuit and the third terminal.

18 Claims, 12 Drawing Sheets

(56) References Cited

FOREIGN PATENT DOCUMENTS

| CN | 110943640 A | 3/2020 |
|---|---|---|
| EP | 3734824 A1 | 11/2020 |
| WO | 2015061405 A1 | 4/2015 |
| WO | 2018210285 A1 | 11/2018 |

OTHER PUBLICATIONS

Floricau et al., "New Active Stacked NPC Multilevel Converter: Operation and Features", IEEE Transactions on Industrial Electronics, IEEE, XP011296195, Jul. 1, 2010, vol. 57, No. 7, pp. 2272-2278.

Wang et al., "Novel High-Efficiency Three-Level Stacked-Neutral-Point-Clamped Grid-Tied Inverter", IEEE Transactions on Industrial Electronics, IEEE, XP011507038, Sep. 1, 2013, vol. 60, No. 9, pp. 3766-3774.

Neto et al., "A Five-Level Stacked Neutral Point Clamped Converter Based on Multi-State Switching Cell", 2017 Brazilian Power Electronics Conference (COBEP), IEEE, XP033297025, Nov. 19, 2017, pp. 1-6.

Feng et al., "Universal Voltage Clamping Circuit for T-Type Neutral-Point-Clamped (TNPC) Converters", 2014 International Power Electronics and Application Conference and Exposition, IEEE, Nov. 2014, 5 pages.

\* cited by examiner

POWER CONVERTER

CROSS-REFERENCE TO RELATED APPLICATIONS

This application is a continuation of International Application No. PCT/CN2021/088750, filed on Apr. 21, 2021, the disclosure of which is hereby incorporated by reference in its entirety.

TECHNICAL FIELD

The embodiments relate to a power converter for voltage conversion, a DC to AC converter, and a method for operating the converter. The embodiments further relate to the circuit topology for a DC to AC power converter and its operating methodology. The embodiments also relate to a power converter that can be used in a renewable energy device such as a photo-voltaic or wind energy device. Furthermore, the concepts of the embodiments can be used in DC to AC or AC to DC converters used electrical drives or EV charging.

BACKGROUND

Currently existing circuits for power converters include three-phase DC/AC inverters based on two- and multi-level circuit topologies of various types. Multi-level converters have been developed; among them the three-level inverters present a good compromise between simplicity and performance and, therefore, have been adopted by the industry. Nevertheless, they also present drawbacks that can limit the performance, or increase the amount of required hardware and the related size and weight. Multi-level converter circuits can employ a single semiconductor technology and material along the circuit, i.e., the same type of switch for all the positions in the circuit. More recently, some hybrid circuits employing SiC and Si semiconductors have been proposed. Nevertheless, when different types of semiconductors are used in the circuit, the way that they interact changes, thereby rising new issues that need to be accounted for.

Issues related to parasitics are still valid, even with higher relevance, in the case of hybrid circuits. Moreover, the interactions between the semiconductor types require to carefully study the behaviour of each semiconductor matching each other for a proper and beneficial circuit operation. For example, fast switching of the SiC semiconductor components may create additional losses on some Si semiconductor components, thus lowering the expected circuit performance.

SUMMARY

It is an object of the embodiments to provide a solution for a power converter in above described applications without the above described disadvantages.

It is an object of the embodiments to introduce new circuit topologies that fully exploit the benefits of each semiconductor technology, including cost; and better matching the requirements of a photovoltaic (PV) system application.

This object is achieved by the features of the embodiments. Further implementation forms are apparent from the description and the figures.

The embodiments describe a novel power converter topology and control mechanism (mentioned as "Power Converter") suitable for DC to/from AC power conversion that can be employed in multi-phase electrical systems.

The embodiments present different circuit topologies with advantageous combinations of switches, for example a) all Si IGBT switches or b) a combination of Si IGBTs and SiC MOSFETs. In both cases SiC Schottky barrier diodes (SBDs) can be advantageously applied to increase switching efficiency at low power loss dissipation and without introducing undesirable harmonic current injections into the grid.

The following terms, abbreviations, and notations will be used:

DC Direct Current
AC Alternating Current
PV Photo-Voltaic
MOSFET Metal-Oxide Semiconductor Field Effect Transistor
IGBT Insulated Gate Bipolar Transistor
EV Electrical Vehicle
PWM Pulse Width Modulation
ZVS Zero Voltage Switching
ZCS Zero Current Switching
SBD Schottky Barrier Diode
DCP Positive DC State
DCN Negative DC State
NS Neutral State
RR Reverse Recovery
NPC Neutral Point Clamped In the embodiments, grids are described. Such a grid is an interconnected network for delivering or distributing electricity from producers to consumers. It may include generating stations that produce electric power, electrical substations for stepping electrical voltage up for transmission or down for distribution, high voltage transmission lines that carry power from distant sources to demand centers and distribution lines that connect individual customers.

Power converters, also referred to as power electronics converters, may convert electric energy from one form to another, such as converting between DC to AC, AC to DC or DC to DC, e.g. between high or medium voltage DC and low voltage DC. A power converter can also change the voltage or frequency or some combination of these. Power electronics converters may be based on power electronics switches that can be actively controlled by applying ON/OFF logic (i.e., PWM operation, which may be commanded by a closed loop control algorithm).

In the embodiments, controllable unidirectional switches and switching circuits are described. Such controllable unidirectional switches and switching circuits are characterized in that only a forward current flow can be controlled, while the reverse current flow cannot be controlled. Such controllable unidirectional switches and switching circuits can be implemented by a freewheeling diode arranged in antiparallel with a switching element such as a transistor.

In the embodiments, controllable bidirectional switches and switching circuits are described. Such controllable bidirectional switches and switching circuits are characterized in that both a forward current flow and the reverse current flow can be controlled. Such controllable unidirectional switches and switching circuits can be implemented for example by two unidirectional switches connected in series with reversed directions or by other circuit arrangements as described below with respect to FIG. 4.

The controllable bidirectional and unidirectional switches and switching circuits can be controlled by a controller. Such a controller or controlling device is any device that can be utilized for regulation of voltage, currents, or powers of a power electronics converter. A controller or controlling device can be a single micro-controller or processor or a multi-core processor or can include a set of micro-controllers or processors or can include elements for controlling and/or processing. The controller can perform control tasks, for example controlling a converter, according to a software, hardware, or firmware application.

According to a first aspect, the embodiments include a power converter for voltage conversion, the power converter including: a first terminal for coupling a positive terminal of a first DC voltage source, a second terminal for coupling a negative terminal of a second DC voltage source and a third terminal for coupling a negative terminal of the first DC voltage source and a positive terminal of the second DC voltage source to form a middle DC voltage, and an AC terminal for coupling an AC voltage; a first controllable unidirectional switching circuit (S1, S2) connected in a forward current direction between the first terminal and the AC voltage terminal, the first controllable unidirectional switching circuit being configured to switch the first terminal to the AC terminal, where the first controllable unidirectional switching circuit includes a first mid terminal connecting a first and a second controllable unidirectional switch of the first controllable unidirectional switching circuit; a second controllable unidirectional switching circuit connected in a forward current direction between the AC terminal and the second terminal, the second controllable unidirectional switching circuit (S3, S4) being configured to switch the second terminal to the AC terminal, where the second controllable unidirectional switching circuit includes a second mid terminal connecting a third and a fourth controllable unidirectional switch (S3, S4) of the second controllable unidirectional switching circuit (S3, S4); a controllable bidirectional switching circuit connected between the third terminal and the AC terminal (104), the controllable bidirectional switching circuit (S5, S6) being configured to switch the third terminal to the AC terminal; a first diode (D7) connected in a forward current direction between the third terminal and the first controllable unidirectional switching circuit (S1, S2), where the first diode (D7) is configured to clamp the first mid terminal to the third terminal; and a second diode (D8) connected in a forward current direction between the second controllable unidirectional switching circuit (S3, S4) and the third terminal, where the second diode (D8) is configured to clamp the second mid terminal to the third terminal.

Note that the term "forward current direction" refers to the current direction of the controlled switch, not to the direction of the diode.

In unidirectional controlled switches, like S1, S2, S3, S4 shown in FIGS. 1a and 1b, the reverse flow cannot be controlled, whereas in bidirectional switches like S5, S6 shown in FIGS. 1a and 1b the reverse flow can be controlled.

In these unidirectional controlled switches, a freewheeling diode is arranged in anti-parallel with the switching elements.

An advantage of such a power converter is its implementation by circuits based on low voltage/low cost semiconductor devices to achieve the high voltage DC output. These circuits have the advantages of low cost, lower conduction losses, they have the potential for high frequency switching operation allowing a compact design, therefore lower switching losses and faster switching times.

If the loss budget is kept constant and switching frequency is increased filter inductor can be small, thereby achieving scalability for power and voltage.

Additional advantages may include the following:

For Solar PV applications the voltage margin can be increased conveniently with readily available power semiconductors.

The SiC SBD diode can be used with minimum reverse recovery to help reduce turn-on losses in the external power semiconductors, in this case T1/T4, that are the ones that support the majority of the losses in the three-level neutral point clamped circuits operating as DC/AC inverter with high power factor.

When using some of the presented operation methods for the power converter, the clamping branch can be realized with a small amount of semiconductor material resulting in cost benefit.

The presented operation methods for the power converter allow to reduce the surge current stress on the SiC SBD by connecting the bidirectional branch in parallel and sharing the load current.

The commutation loops can be confined to either to positive or negative portion of the phase leg. Therefore, the length of the loop and value of the commutation loop inductance can be minimized Thus, the commutation transient behavior can be optimized, leading to operation at increased efficiency.

In an exemplary implementation of the power converter, the power converter includes: a seventh unidirectional switch (S7) formed by the first diode (D7) and a first switching element connected in anti-parallel to the first diode (D7), where the seventh unidirectional switch (S7) is configured to allow reverse current flow between the first mid terminal and the third terminal.

In an exemplary implementation of the power converter, the power converter includes: an eighth unidirectional switch (S8) formed by the second diode (D8) and a second switching element connected in anti-parallel to the second diode (D8), where the eighth unidirectional switch (S8) is configured to allow reverse current flow between the third terminal and the second mid terminal.

In an exemplary implementation of the power converter, at least one of the first or second controllable unidirectional switching circuits (S1, S2, S3, S4) includes an insulated gate bipolar transistor.

In an exemplary implementation of the power converter, at least one of the first or second controllable unidirectional switching circuits (S1, S2, S3, S4) includes a switching element and a diode connected in anti-parallel to the switching element.

In an exemplary implementation of the power converter, the switching element includes one of a MOSFET transistor, a bipolar transistor, or an insulated gate bipolar transistor.

In an exemplary implementation of the power converter, the power converter is configured to switch the controllable switching circuits (S1, S2, S3, S4, S5, S6) of the power converter from a first state in which the AC terminal is switched to the first terminal to a second state in which the AC terminal is switched to the third terminal by passing a first and a second intermediate state.

In an exemplary implementation of the power converter, in the first intermediate state, a first conduction path is established from the third terminal via the first diode (D7) and the second controllable unidirectional switch (S2) of the first controllable unidirectional switching circuit (S1, S2) to the AC terminal; and in the second intermediate state, the first conduction path is established from the third terminal via the first diode (D7) and the second controllable unidirectional switch (S2) of the first controllable unidirectional switching circuit (S1, S2) to the AC terminal and additionally a second conduction path is established from the third terminal via the controllable bidirectional switching circuit (S5, S6) to the AC terminal.

Establishing this conduction state may imply in this case (and in some other similar cases) disabling another possible conduction path. In this case this would be the path through switch S1 that must be turned-off.

In an exemplary implementation of the power converter, the power converter is configured to switch the controllable switching circuits (S1, S2, S3, S4, S5, S6) of the power converter from the second state back to the first state by passing the second and the first intermediate state.

An analog sequence with two intermediate states is used to switch the AC terminal from the second terminal to the third terminal. In this case, the intermediate states use the complementary branches with respect to the sequence used to change the connection of the AC terminal from the first to the third terminals, previously described. This means the first intermediate state establishes a current conduction path through diode D8 and switch S3, from switching circuit (S3, S4). And the second intermediate state includes both conduction paths through D8 and S3, and the bidirectional switch branch (S5, S6). Where additionally the same intermediate states can be used to connect back the output terminal from the third terminal to the second input terminal.

In an exemplary implementation of the power converter, the power converter is configured to switch the controllable switching circuits (S1, S2, S3, S4, S5, S6) of the power converter from a first state in which the AC terminal is switched to the first terminal to a second state in which the AC terminal is switched to the third terminal by passing a first intermediate state; and configured to switch the controllable switching circuits (S1, S2, S3, S4, S5, S6) of the power converter from the second state back to the first state by passing the first intermediate state and/or an optional second intermediate state.

Optionally, the sequence from the second state to the first state could also include a second intermediate state.

In an exemplary implementation of the power converter, in the first intermediate state, a first conduction path is established from the third terminal via the first diode (D7) and the second controllable unidirectional switch (S2) of the first controllable unidirectional switching circuit (S1, S2) to the AC terminal and additionally a second conduction path is established from the third terminal via the controllable bidirectional switching circuit (S5, S6) to the AC terminal; and in the second intermediate state, the first conduction path is established from the third terminal via the first diode (D7) and the second controllable unidirectional switch (S2) of the first controllable unidirectional switching circuit (S1, S2) to the AC terminal.

An analog switching sequence using the complementary branches of the circuit is used to switch the connection of the output terminal from the second DC voltage, i.e., the second terminal of power converter, to the third DC voltage, i.e., the third terminal of power converter. Note that the following terms apply here: The first DC voltage corresponds to the first terminal of power converter, the second DC voltage corresponds to the second terminal of power converter, and the third DC voltage corresponds to the third terminal of power converter. In this case, the first intermediate state establishing a conduction path through both diode D8 and switch S3, from switching circuit (S3, S4) and a second conduction path through the bidirectional switch (S5, S6). Where an additional, optional, intermediate state can also be used in the switching back sequence, i.e., when connecting the AC terminal to the second terminal back from third terminal. This intermediate state may establish a current circulation path through diode D8 and switch S3, from switching circuit (S3, S4).

In an exemplary implementation of the power converter, the power converter is configured to switch the controllable switching circuit (S1, S2, S3, S4, S5, S6) of the power converter from a first state in which the AC terminal is switched to the first terminal to a second state in which the AC terminal is switched to the third terminal directly by establishing a conduction state that includes both, a first conduction path through the first diode (D7) and the second controllable unidirectional switch (S2) of the first controllable unidirectional switching circuit (S1, S2); and a second conduction path through the controllable bidirectional switching circuit (S5, S6); and is configured to switch the controllable switching circuits (S1, S2, S3, S4, S5, S6) of the power converter from the second state back to the first state directly, or by passing through a first intermediate state.

In an exemplary implementation of the power converter, in the first intermediate state, the first conduction path is established from the third terminal via the first diode (D7) and the second controllable unidirectional switch (S2) of the first controllable unidirectional switching circuit (S1, S2) to the AC terminal.

In an exemplary implementation of the power converter, in the second state, the first conduction path is established from the third terminal via the first diode (D7) and the first controllable unidirectional switching circuit (S1, S2) to the AC terminal and additionally the second conduction path is established from the third terminal via the controllable bidirectional switching circuit (S5, S6) to the AC terminal.

An analog switching sequence can be used to switch the connection of the output terminal from the second DC voltage to third DC voltage. This sequence using the complementary branches with respect to the ones used above. In this case being the connection of third terminal to AC terminal established through diode (D8) and switch S3 from the switching circuit (S3, S4), and the bidirectional switch branch (S5, S6). Additionally, in this case being the intermediate, optional, state for the sequence back from third terminal to second terminal the one establishing a current conduction path through diode (D8) and switch S3 from the switching circuit (S3, S4).

In an exemplary implementation of the power converter, the power converter is configured to switch the controllable switching circuits (S1, S2, S3, S4, S5, S6, S7, S8) in order to switch the connection of the AC terminal from the first terminal in a first state to the third terminal in a second state and back.

In this case the current flows from the AC terminal to the first and third terminals. This change of states is being done by passing through two intermediate states.

The first intermediate state is configured to establish a current conduction path through switching device (S7) and diode D2 of the switching circuit (S1, S2). And the second intermediate state is configured to establish current conduction paths through both the bidirectional switch (S5, S6) and the switching device (S7) and diode (D2) of the switching circuit (S1, S2).

An analog switching sequence can be used to switch the connection of the AC terminal from the second terminal to the third terminal; with the current flowing from the AC terminal to the second or third terminal. Whereas in this case the complementary circuit branches to the ones described above are used to execute the connection change.

In an exemplary implementation of the power converter, one or both of the first diode (D7) and the second diode (D8) include a Schottky barrier diode.

In an exemplary implementation of the power converter, the power converter further includes: a ninth controllable unidirectional switching circuit (S9) connected in a forward current direction between the first terminal and the AC terminal; and a tenth controllable unidirectional switching circuit (S10) connected in a forward current direction between the AC terminal and the second terminal.

According to a second aspect, the embodiments include a power converter for voltage conversion, the power converter including: a first terminal for coupling a positive terminal of a first DC voltage source, a second terminal for coupling a negative terminal of a second DC voltage source and a third terminal for coupling a negative terminal of the first DC voltage source and a positive terminal of the second DC voltage source to form a middle DC voltage, and an AC terminal for coupling an AC voltage; a first controllable unidirectional switching circuit (S1, S2) connected in a forward current direction between the first terminal and the AC terminal, the first controllable unidirectional switching circuit (S1, S2) being configured to switch the first terminal to the AC terminal; a second controllable unidirectional switching circuit (S3, S4) connected in a forward current direction between the AC terminal and the second terminal, the second controllable unidirectional switching circuit (S3, S4) being configured to switch the second terminal to the AC terminal; and a controllable bidirectional switching circuit (S5, S6) connected between the third terminal and the AC terminal, the controllable bidirectional switching circuit (S5, S6) being configured to switch the third terminal to the AC terminal.

BRIEF DESCRIPTION OF THE DRAWINGS

Further embodiments will be described with respect to the following figures, in which:

FIG. 1a shows a circuit diagram illustrating a first example of a power converter 100a;

DETAILED DESCRIPTION OF THE EMBODIMENTS

In the following detailed description, reference is made to the accompanying drawings, which form a part thereof, and in which is shown, by way of illustration, aspects in which the embodiments may be practiced. It is understood that other aspects may be utilized, and structural or logical changes may be made without departing from the scope of the embodiments. The following detailed description, therefore, is not to be taken in a limiting sense, and the scope is not limited.

It is understood that comments made in connection with a described method may also hold true for a corresponding device or system configured to perform the method and vice versa. For example, if a method step is described, a corresponding device may include a unit to perform the described method step, even if such unit is not explicitly described or illustrated in the figures. Further, it is understood that the features of the various exemplary aspects described herein may be combined with each other, unless noted otherwise.

Figure 1A:
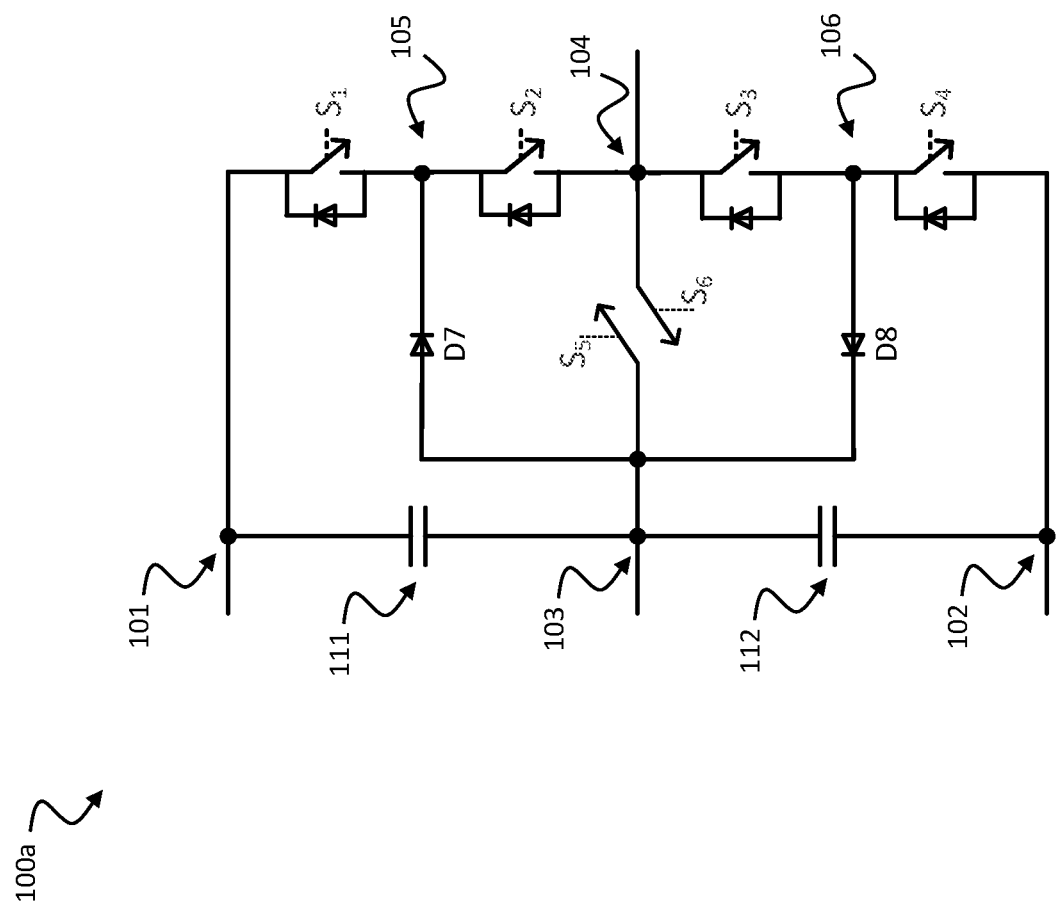

FIG. 1a shows a circuit diagram illustrating a first example of a power converter 100a.

The power converter 100a includes a first terminal 101 for coupling a positive terminal of a first DC voltage source 111.

The power converter 100a includes a second terminal 102 for coupling a negative terminal of a second DC voltage source 112.

The power converter 100a includes a third terminal 103 for coupling a negative terminal of the first DC voltage source 111 and a positive terminal of the second DC voltage source 112 to form a middle DC voltage.

The power converter 100a includes an AC terminal 104 for coupling an AC voltage.

The power converter 100a includes a first controllable unidirectional switching circuit S1, S2 connected in a forward current direction between the first terminal 101 and the AC voltage terminal 104. The first controllable unidirectional switching circuit S1, S2 is configured to switch the first terminal 101 to the AC terminal 104. The first controllable unidirectional switching circuit S1, S2 includes a first mid terminal 105 connecting a first S1 and a second S2 controllable unidirectional switch of the first controllable unidirectional switching circuit S1, S2.

The power converter 100a includes a second controllable unidirectional switching circuit S3, S4 connected in a forward current direction between the AC terminal 104 and the second terminal 102. The second controllable unidirectional switching circuit S3, S4 is configured to switch the second terminal 102 to the AC terminal 104. The second controllable unidirectional switching circuit S3, S4 includes a second mid terminal 106 connecting a third S3 and a fourth S4 controllable unidirectional switch of the second controllable unidirectional switching circuit S3, S4.

The power converter 100a includes a controllable bidirectional switching circuit S5, S6 connected between the third terminal 103 and the AC terminal 104. The controllable bidirectional switching circuit S5, S6 is configured to switch the third terminal 103 to the AC terminal 104.

The power converter 100a includes a first diode D7 connected in a forward current direction between the third terminal 103 and the first controllable unidirectional switching circuit S1, S2. The first diode D7 is configured to clamp the first mid terminal 105 to the third terminal 103.

The power converter 100a includes a second diode D8 connected in a forward current direction between the second controllable unidirectional switching circuit S3, S4 and the third terminal 103. The second diode D8 is configured to clamp the second mid terminal 106 to the third terminal 103.

This power converter 100a implements a novel power converter topology and control mechanism (mentioned as "Power Converter") suitable for DC to/from AC power conversion that can be employed in multi-phase electrical systems. The circuit of FIG. 1a represents a phase-leg of the novel power converter topology. An exemplary combination for the switches shown in FIG. 1a can be the following: a) all Si IGBT switches or b) a combination of Si IGBTs and SiC MOSFETs. In both cases SiC SBD diodes may be used in positions D7/D8. Other combinations of power semiconductor devices are possible as well.

Figure 1B:
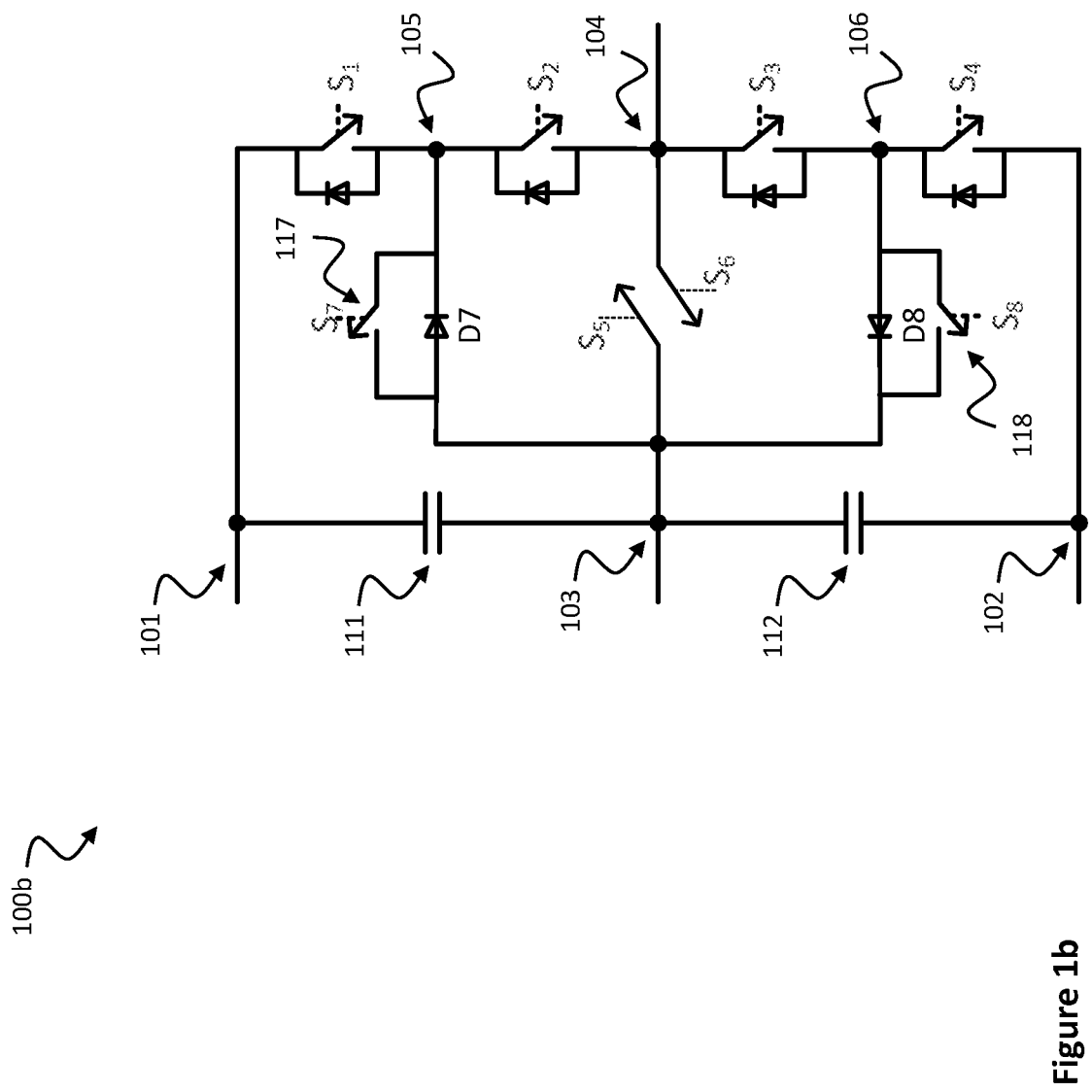
FIG. 1b shows a circuit diagram illustrating a second example of a power converter 100b.

FIG. 1b shows a circuit diagram illustrating a second example of a power converter 100b.

The power converter 100b is similar to the power converter 100a described above with respect to FIG. 1a. I.e., the power converter 100b includes a first terminal 101 for coupling a positive terminal of a first DC voltage source 111; a second terminal 102 for coupling a negative terminal of a second DC voltage source 112; and a third terminal 103 for coupling a negative terminal of the first DC voltage source 111 and a positive terminal of the second DC voltage source 112 to form a middle DC voltage. The power converter 100b further includes an AC terminal 104 for coupling an AC voltage.

The power converter 100b includes a first controllable unidirectional switching circuit S1, S2 as described for the power converter 100a of FIG. 1a. The power converter 100b includes a second controllable unidirectional switching circuit S3, S4 as described for the power converter 100a of FIG. 1a. The power converter 100b further includes a controllable bidirectional switching circuit S5, S6 as described for the power converter 100a of FIG. 1a.

The power converter 100b includes a first diode D7 connected in a forward current direction between the third terminal 103 and the first controllable unidirectional switching circuit S1, S2. The first diode D7 is configured to clamp the first mid terminal 105 to the third terminal 103.

The power converter 100b includes a seventh unidirectional switch S7 formed by the first diode D7 and a first switching element 117 connected in anti-parallel to the first diode D7. The seventh unidirectional switch S7 is configured to allow current flow between the first mid terminal 105 and the third terminal 103.

The power converter 100b includes a second diode D8 connected in a forward current direction between the second controllable unidirectional switching circuit S3, S4 and the third terminal 103. The second diode D8 is configured to clamp the second mid terminal 106 to the third terminal 103.

The power converter 100b includes an eighth unidirectional switch S8 formed by the second diode D8 and a second switching element 118 connected in anti-parallel to the second diode D8. The eighth unidirectional switch S8 is configured to allow current flow between the third terminal 103 and the second mid terminal 106.

Figure 2:
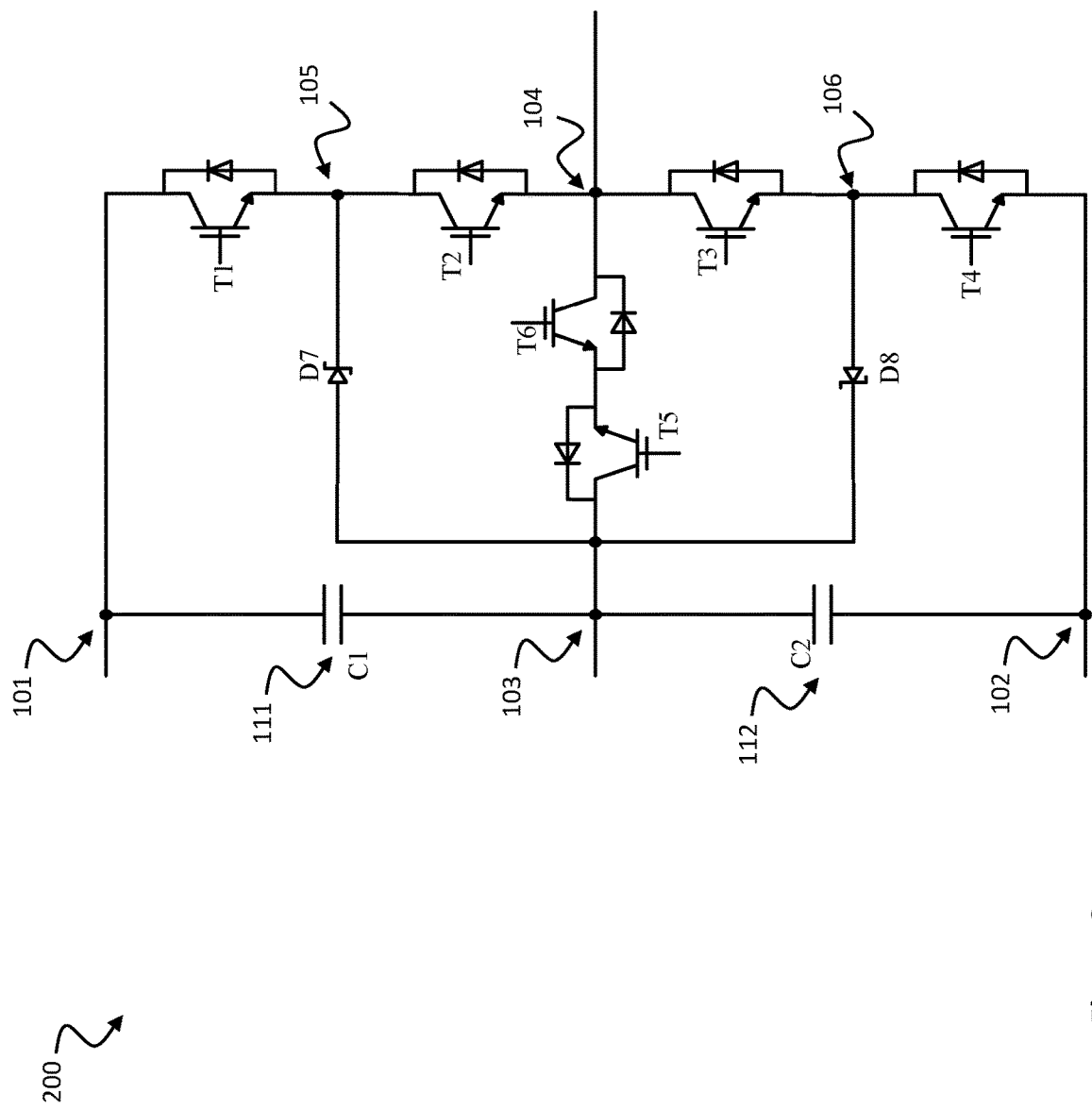
FIG. 2 shows a circuit diagram illustrating a third example of a power converter 200.

FIG. 2 shows a circuit diagram illustrating a third example of a power converter 200.

The power converter 200 is an implementation of the power converter 100a described above with respect to FIG. 1a. In this implementation, the first controllable unidirectional switching circuit S1, S2 includes a first controllable unidirectional switch T1 and a second controllable unidirectional switch T2 which are unidirectional connected in series. Both controllable unidirectional switches T1 and T2 are connected to the first mid terminal 105.

The first controllable unidirectional switch T1 and the second controllable unidirectional switch T2 can each be implemented by an insulated gate bipolar transistor and a diode connected anti-parallel to the bipolar transistor.

The second controllable unidirectional switching circuit S3, S4 includes a third controllable unidirectional switch T3 and a fourth controllable unidirectional switch T4 which are unidirectional connected in series. Both controllable unidirectional switches T3 and T4 are connected to the second mid terminal 106.

The third controllable unidirectional switch T3 and the fourth controllable unidirectional switch T4 can each be implemented by an insulated gate bipolar transistor and a diode connected anti-parallel to the bipolar transistor.

The controllable bidirectional switching circuit S5, S6 includes a fifth controllable unidirectional switch T5 and a sixth controllable unidirectional switch T6 which are bidirectional connected with respect to each other.

The fifth controllable unidirectional switch T5 and the sixth controllable unidirectional switch T6 can each be implemented by an insulated gate bipolar transistor and a diode connected anti-parallel to the bipolar transistor.

The idea of the circuit topology shown in FIG. 2 is to exploit the good characteristics of both the T-type and the NPC three-level inverters. From the T-type the circuit inherits the ability to avoid the long commutation loops characteristics of the NPC circuit by confining the commutation to both sides of the bidirectional switch branch (T5 & T6). From the NPC circuit it inherits the short commutation loops that can be implemented including SBD diodes (D7 & D8) in such a way that the switching power losses taking place on the external switches (T1 & T4) are reduced. It also benefits from the use of two devices in the external switching branch (vertical branch), which reduces the voltage blocking rating need; in this way overcoming one of the major drawbacks of the T-type circuit.

When the PV is connected to the grid, the operation may be characterized by relatively large modulation indexes and high power factors. In such cases, the bidirectional switch branch devices (T5 & T6) are lightly loaded and could be implemented with Si based semiconductors. The bidirectional switch branch has also the capacity to bypass the clamping diodes (D7 & D8) in the N-state, thus reducing the current carrying burden from them. This fact reduces the amount of SBD diodes required in the neutral clamping and brings the additional advantage that can be used for significantly lowering the repetitive surge current requirement of those SBD diodes.

For the DC-AC inverter with high pf operation characteristic of PV, the switch positions supporting most of the commutation loss are T1 and T4. Therefore, SiC MOSFETs may be employed in those positions. In this way, the switching losses are greatly reduced and the benefits of using SiC are maximized. In case that Si is used in T1 & T4 the switching losses are reduced when SiC SDBs are used as clamping diodes D7 & D8, because most of the commutations happens between the pairs T1-D7 and T4-D8. The power switch positions T2 & T3 can be operated without significant involvement in the commutations and, therefore; can be suited with Si IGBTs optimized for conduction; in that way contributing to an overall low power loss dissipation. With regard to the power semiconductors in the bidirectional switch branch S5 & S6, for the previously mentioned operation conditions, they can support a mild amount of switching and conduction and Si IGBTs properly sized can be used beneficially in such positions.

Figure 3:
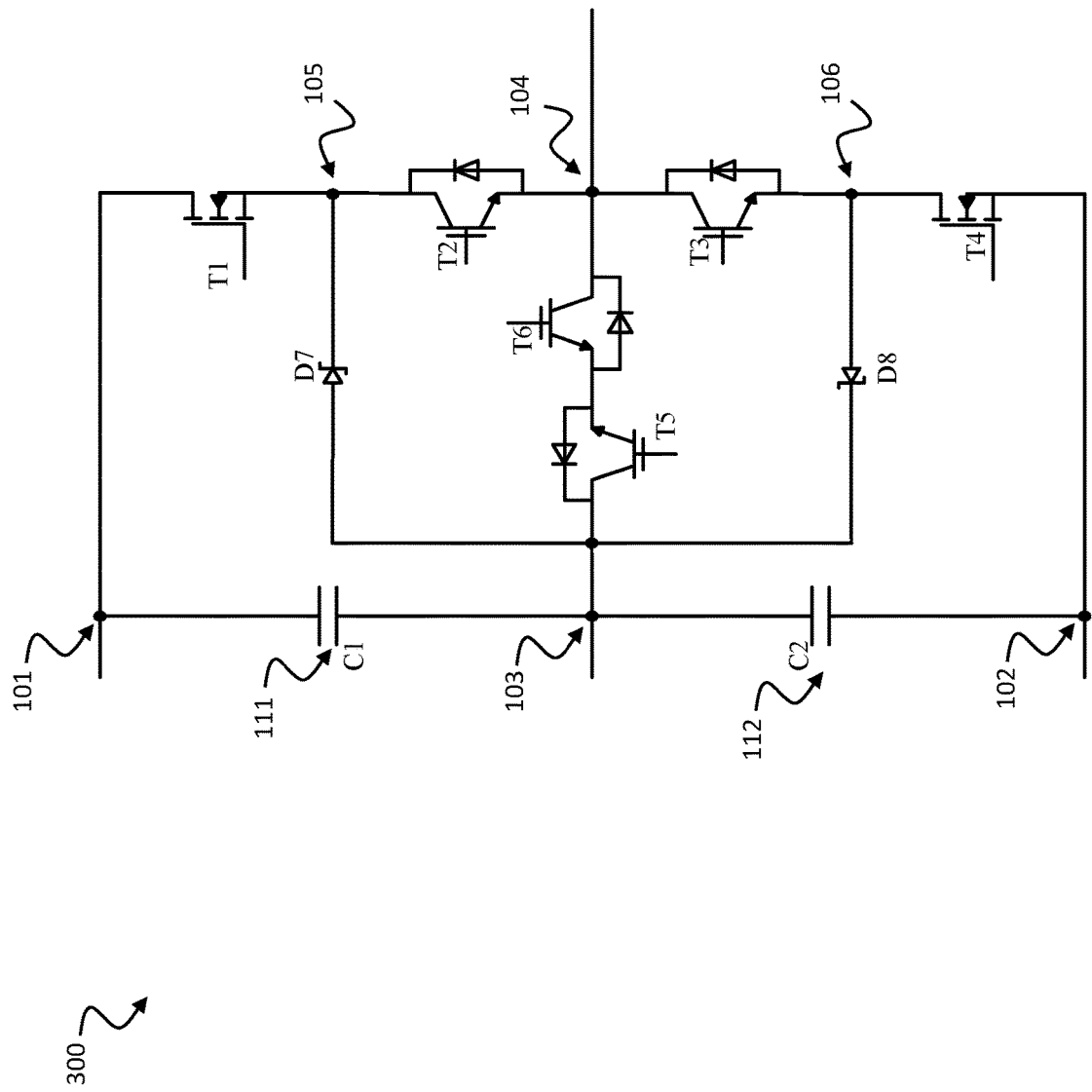
FIG. 3 shows a circuit diagram illustrating a fourth example of a power converter 300.

FIG. 3 shows a circuit diagram illustrating a fourth example of a power converter 300.

The power converter 300 is an implementation of the power converter 100a described above with respect to FIG. 1a. In this implementation, the first controllable unidirectional switching circuit S1, S2 includes a first controllable unidirectional switch T1 and a second controllable unidirectional switch T2 which are unidirectional connected in series. Both controllable unidirectional switches T1 and T2 are connected to the first mid terminal 105.

Figure 4:
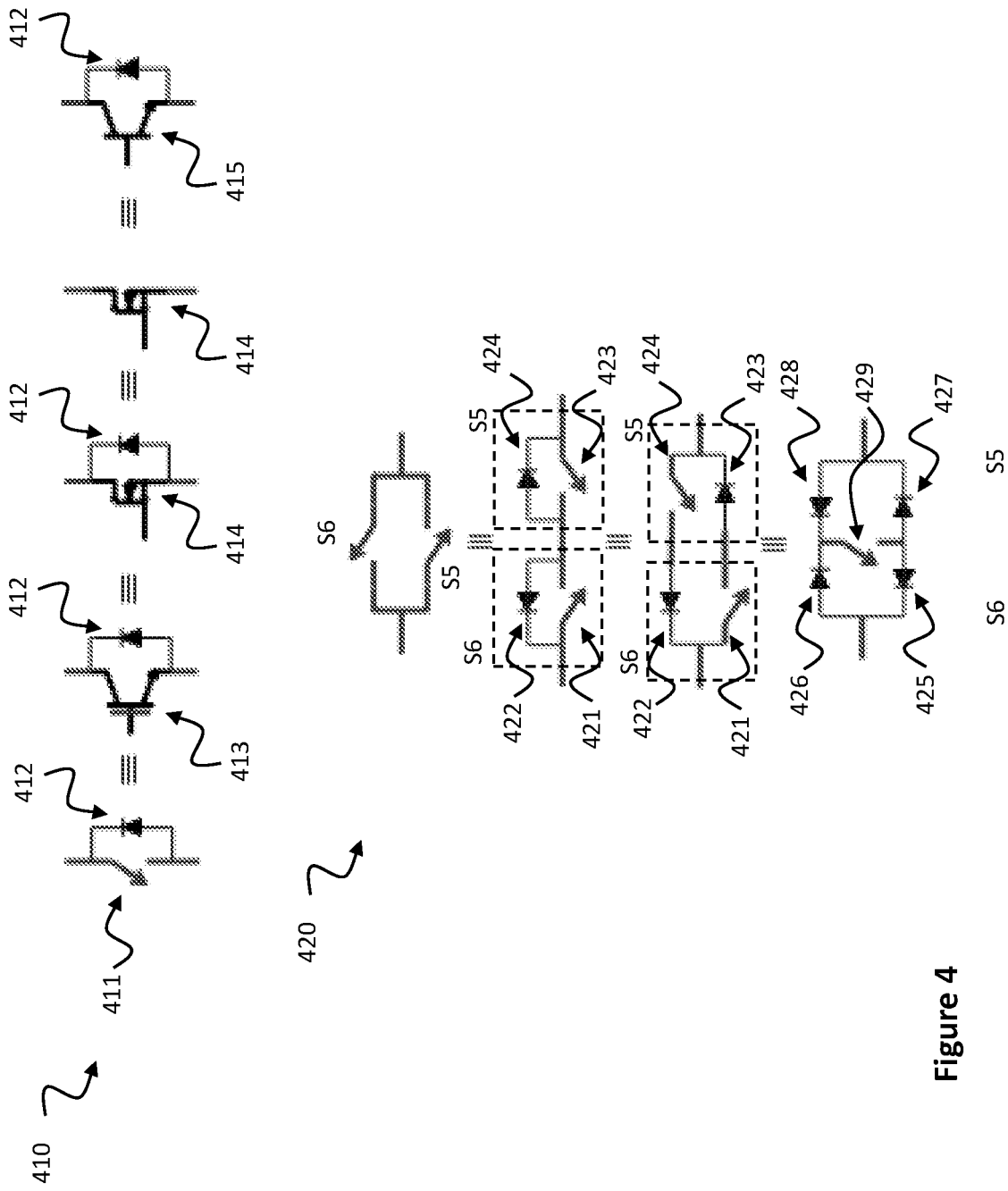
FIG. 4 shows circuit implementations of unidirectional controlled switches 410 and bidirectional controlled switches 420 used in power converters.

The first controllable unidirectional switch T1 can be implemented by a metal-oxide semiconductor field effect transistor (MOSFET) and an optional diode, e.g., the body diode as per 414 shown in FIG. 4, connected parallel to the MOSFET. The second controllable unidirectional switch T2 can each be implemented by an insulated gate bipolar transistor (IGBT) and a diode connected anti-parallel to the bipolar transistor.

The second controllable unidirectional switching circuit S3, S4 includes a third controllable unidirectional switch T3 and a fourth controllable unidirectional switch T4 which are unidirectional connected in series. Both controllable unidirectional switches T3 and T4 are connected to the second mid terminal 106.

The fourth controllable unidirectional switch T4 can be implemented by a metal-oxide semiconductor field effect transistor (MOSFET) and an optional diode, e.g., the body diode as per 414 shown in FIG. 4, connected parallel to the MOSFET. The third controllable unidirectional switch T3 can each be implemented by an insulated gate bipolar transistor (IGBT) and a diode connected anti-parallel to the bipolar transistor.

The controllable bidirectional switching circuit S5, S6 includes a fifth controllable unidirectional switch T5 and a sixth controllable unidirectional switch T6 which are bidirectional connected with respect to each other.

The fifth controllable unidirectional switch T5 and the sixth controllable unidirectional switch T6 can each be implemented by an insulated gate bipolar transistor and a diode connected anti-parallel to the bipolar transistor.

FIG. 4 shows circuit implementations of unidirectional controlled switches 410 and bidirectional controlled switches 420 used in power converters.

The first or second controllable unidirectional switching circuits S1, S2, S3, S4 as described above with respect to FIGS. 1a, 1b, 2 and 3 can be implemented by a switching element 411 and a diode 412 connected in anti-parallel to the switching element 411.

This switching element 411 can be implemented by an insulated gate bipolar transistor 413, a MOSFET transistor 414 or a bipolar transistor 415.

Alternatively, the first or second controllable unidirectional switching circuits S1, S2, S3, S4 as described above with respect to FIGS. 1a, 1b, 2 and 3 can be implemented by a MOSFET transistor 414.

Each of the fifth controllable unidirectional switch S5 and the sixth controllable unidirectional switch S6 as described above with respect to FIGS. 1a, 1b, 2 and 3 may include a switching element 421, 423 and a diode 422, 424 connected in parallel to the switching element 421, 423. The fifth controllable unidirectional switch S5 and the sixth controllable unidirectional switch S6 may be connected in series in opposite directions.

The switching element 421 of the fifth controllable unidirectional switch S5 may be connected in series with the diode 424 of the sixth controllable unidirectional switch S6 and the switching element 423 of the sixth controllable unidirectional switch S6 may be connected in series with the diode 422 of the fifth controllable unidirectional switch S5.

Alternatively, the controllable bidirectional switching circuit S5, S6 may include four diodes 425, 426, 427, 428 forming a H-bridge circuit and a switching element 429 connecting both branches of the H-bridge circuit.

The circuit topology of the power converter introduces some redundancy in the Neutral state connection enabling for several methods of operation. Three major operation methods are for the commutation between, either the DC positive (DCP) or DC negative (DCN), and the neutral state (NS). These methods of operation are described in the following with respect to FIGS. 5 to 7.

Figure 5:
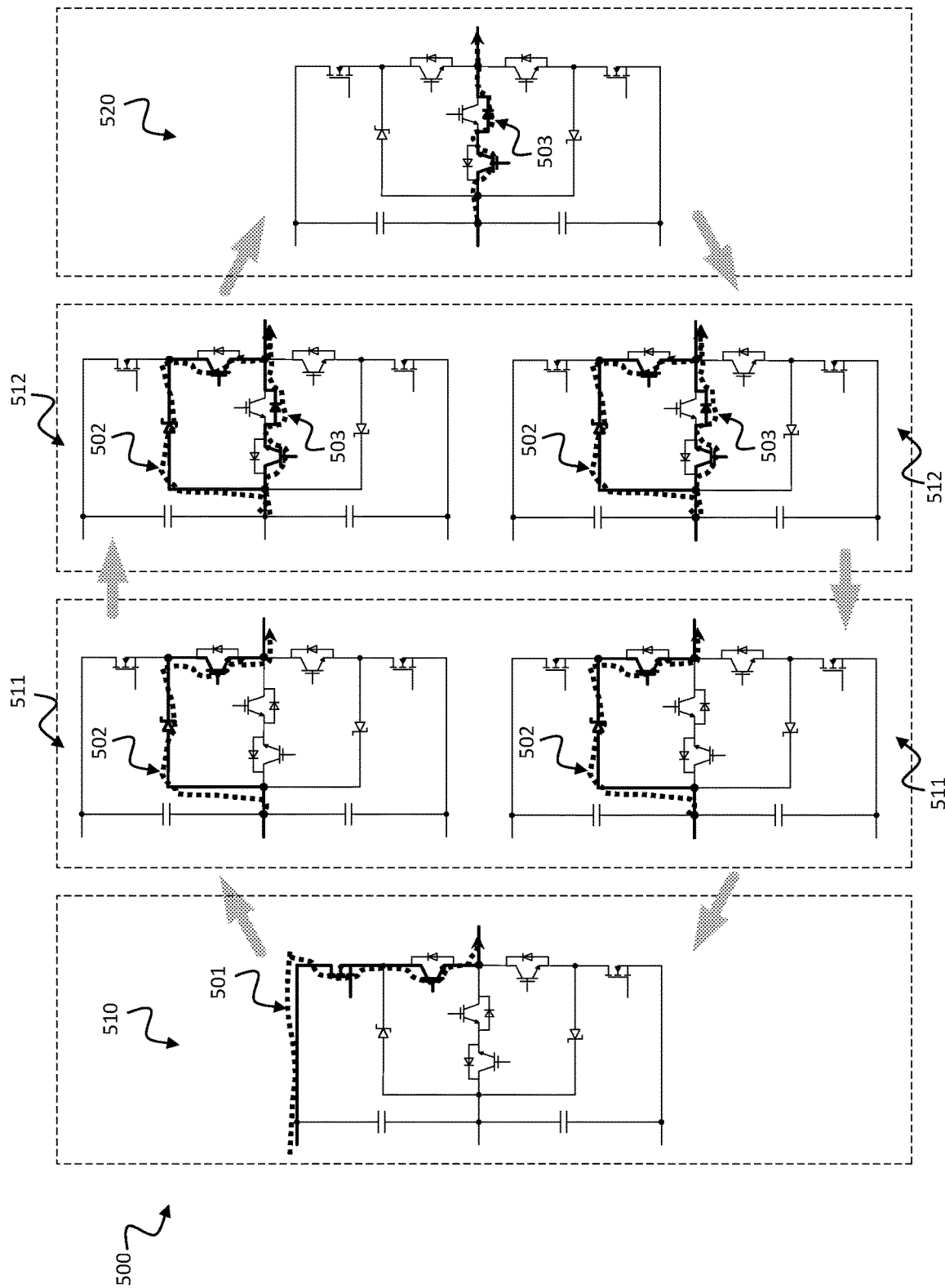
FIG. 5 shows a schematic diagram 500 illustrating exemplary states and state transitions of power converters.

FIG. 5 shows a schematic diagram 500 illustrating exemplary states and state transitions of power converters. These states and state transitions are exemplarily illustrated for the power converter 200 described in FIG. 2 but are also valid for the other power converters 100a, 100b, 300 described in FIGS. 1a, 1b and 3.

The power converter 200 is configured to switch the controllable switching circuits S1, S2, S3, S4, S5, S6 of the power converter 200 from a first state 510 in which the AC terminal 104 is switched to the first terminal 101 to a second state 520 in which the AC terminal 104 is switched to the third terminal 103 by passing a first 511 and a second 512 intermediate state.

In the first intermediate state 511, a first conduction path 502 is established from the third terminal 103 via the first diode D7 and the second controllable unidirectional switch S2 of the first controllable unidirectional switching circuit S1, S2 to the AC terminal 104.

In the second intermediate state 512, the first conduction path 502 is established from the third terminal 103 via the first diode D7 and the second controllable unidirectional switch S2 of the first controllable unidirectional switching circuit S1, S2 to the AC terminal 104 and additionally a second conduction path 503 is established from the third terminal 103 via the controllable bidirectional switching circuit S5, S6 to the AC terminal 104.

Establishing this conduction state may imply in this case (and in some other similar cases) disabling another possible conduction path. In this case this would be the path through switch S1 that must be turned-off.

The power converter 200 is configured to switch the controllable switching circuits S1, S2, S3, S4, S5, S6 of the power converter 200 from the second state 520 back to the first state 510 by passing the second 512 and the first 511 intermediate states.

An analog sequence with two intermediate states is used to switch the AC terminal 104 from the second terminal 102 to the third terminal 103. In this case, the intermediate states use the complementary branches with respect to the sequence described above. This means the first intermediate state establishes a current conduction path through diode D8 and switch S3, from switching circuit S3, S4. And the second intermediate state includes both conduction paths through D8 and S3, and the bidirectional switch branch S5, S6. Where additionally the same intermediate states can be used to connect back the output terminal 104 from the third input terminal 103 to the second input terminal 102.

FIG. 5 presents a first operation method of the power converters 100a, 100b, 200, 300 described above with respect to FIGS. 1a, 1b, 2 and 3.

This first method may include transferring all the load current to the clamping branch during the transitions between the DCP (DCN) and NS. This may be achieved by conveniently operating the external branch switches connected to the AC terminal T2 and T3 and the internal branch switches T5 and T6.

The idea driving the method is to fully exploit the absence of the reverse recovery (RRe) phenomena, and corresponding commutation losses, in the SBDs D7 & D8. In this way the switching losses, such as turn-on, in the external power switches are greatly reduced because they commutate primarily against the SBDs. Moreover, the reverse recovery in the diodes in the bidirectional switch branch can also be greatly minimized because they are turned-off while the clamping branch, which is connected in parallel, is still in conduction.

The sequence of the method is illustrated in FIG. 5 that depicts the transition from/to the DCP to the Zero State or Neutral State (NS). The Zero State or Neutral State in multilevel converters defines the reference point between the DCP state and the DCN state. In the DCP to NS transition (0 to 3 in the Figure) T1 turns-off while T2 is kept on transferring all current the clamping branch Immediately after T5 is turned-on, under Zero Voltage Switching (ZVS), taking part of the current flowing from the Neutral connection. To complete the transition T2 is turned-off, also under ZVS condition. For the transition from the NS to the DCP state (3 to 6 in the Figure) first T2 is turned-on under ZVS condition and the clamping branch absorbs part of the current. Then T5 is turned off under ZVS, transferring all current to the clamping branch. At this point also D6 goes to blocking under ZVS greatly lowering reverse recovery (RR). Immediately after, T1 is turned-on making the SBD DT go into blocking state and completing the transition. The absence of RR in the SBD contributes to reduced turn-on losses in T1.

The method operates in a complementary way for the transition between the DCN and the NS when the current reverses.

Figure 6:
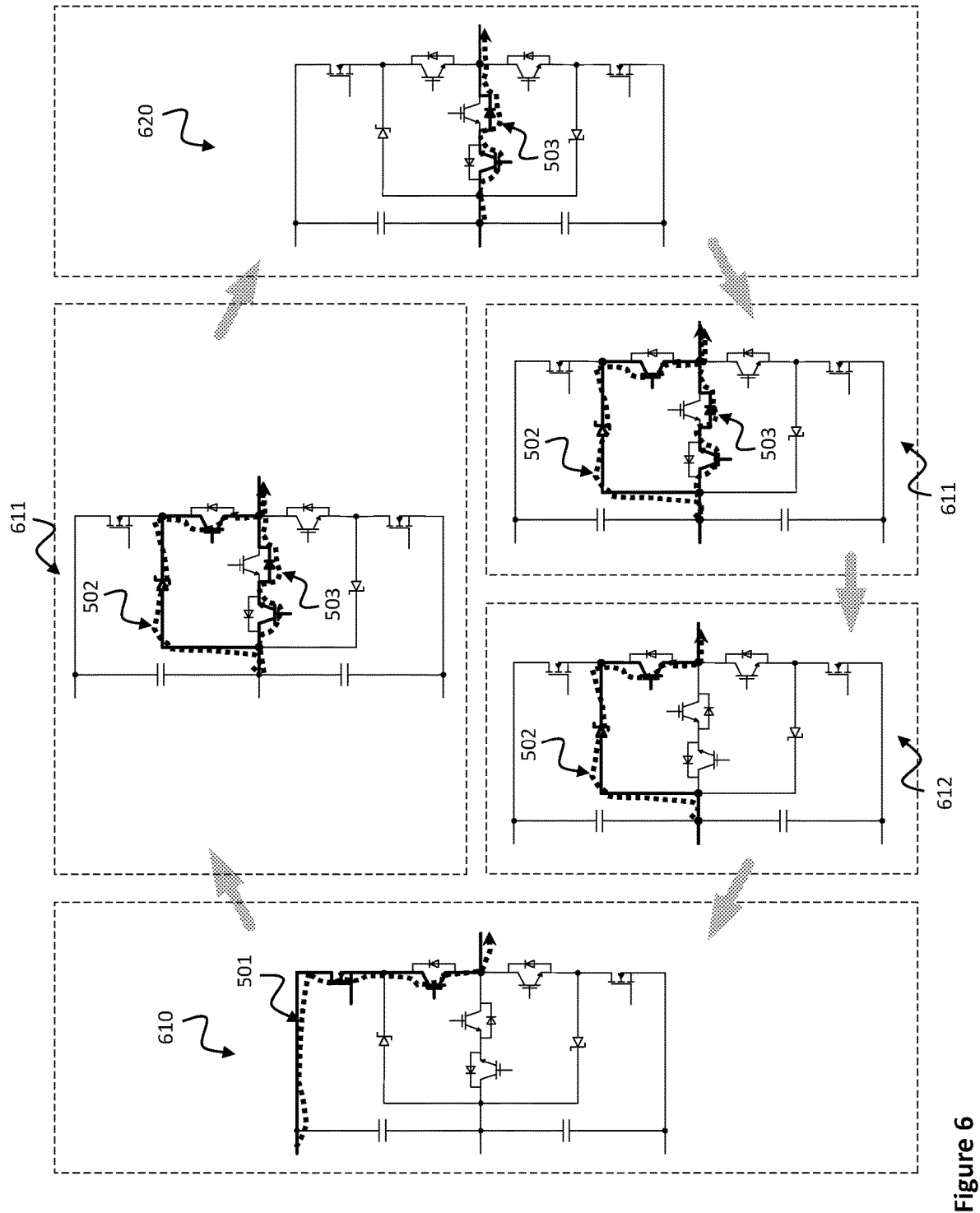
FIG. 6 shows a schematic diagram 600 illustrating exemplary states and state transitions of power converters.

FIG. 6 shows a schematic diagram 600 illustrating exemplary states and state transitions of power converters. These states and state transitions are exemplarily illustrated for the power converter 200 described in FIG. 2 but are also valid for the other power converters 100a, 100b, 300 described in FIGS. 1a, 1b and 3.

The power converter 200 is configured to switch the controllable switching circuits S1, S2, S3, S4, S5, S6 of the power converter 200 from a first state 610 in which the AC terminal 104 is switched to the first terminal 101 to a second state 620 in which the AC terminal 104 is switched to the third terminal 103 by passing a first intermediate state 611.

The power converter 200 is configured to switch the controllable switching circuits S1, S2, S3, S4, S5, S6 of the power converter 200 from the second state 620 back to the first state 610 by passing the first intermediate state 611 and/or an optional second intermediate state 612.

Optionally, the sequence from the second state 620 to the first state 610 can also include a second intermediate state 612.

In the first intermediate state 611, a first conduction path 502 is established from the third terminal 103 via the first diode D7 and the second controllable unidirectional switch S2 of the first controllable unidirectional switching circuit S1, S2 to the AC terminal 104 and additionally a second conduction path 503 is established from the third terminal 103 via the controllable bidirectional switching circuit S5, S6 to the AC terminal 104.

In the second intermediate state 612, the first conduction path 502 is established from the third terminal 103 via the first diode D7 and the second controllable unidirectional switch S2 of the first controllable unidirectional switching circuit S1, S2 to the AC terminal 104.

An analog switching sequence using the complementary branches of the circuit is used to switch the connection of the output terminal 104 from the second DC voltage 102 to the third DC voltage 103. In this case, the first intermediate state establishing a conduction path through both diode D8 and switch S3, from switching circuit S3, S4. And the second conduction path through the bidirectional switch S5, S6. Where an additional, optional, intermediate state can also be used in the switching back sequence, i.e., when connecting the output terminal 104 to the input terminal 102 back from 103. This intermediate state establishing a current circulation path through diode D8 and switch S3, from switching circuit S3, S4.

FIG. 6 presents a second operation method of the power converters 100a, 100b, 200, 300 described above with respect to FIGS. 1a, 1b, 2 and 3.

This second method uses the clamping branch as a helper during the commutation to/from the DCP (or the DCN) to the NS. The idea behind this method is to lower the current conduction requirements on the clamping diode by engaging the bidirectional switch branch such that during the transition both the clamping diode and bidirectional switch conduct the current.

The sequence of this second method is illustrated in FIG. 6 that depicts the transition from/to the DCP to the New states. In this method T5 is gated-on before T1 is turned-off and therefore, both D7 and T5-D6 takes the current when T1 is turned-off. T5 turning on in this way is under ZVS condition Immediately after T2 is turned-off (under ZVS) completing the transition to NS. For the transition from NS to DCP T2 is turned on, under ZVS, transferring part of the current to the clamping branch and shortly after T1 is turned on producing the blocking of both D6 and D7. In this case some RR will appear on D6. Because of that the turn-on loss on T1 will be higher than with method 1. In case it is desired to avoid this increase in the commutation losses, a possible variant may consist of turning-off T5, under ZVS condition before turning-on T1 such that the load current is fully transferred to the clamping branch before turning-on T1. In this way, most of the losses are avoided in a similar way as the method 1.

Figure 7:
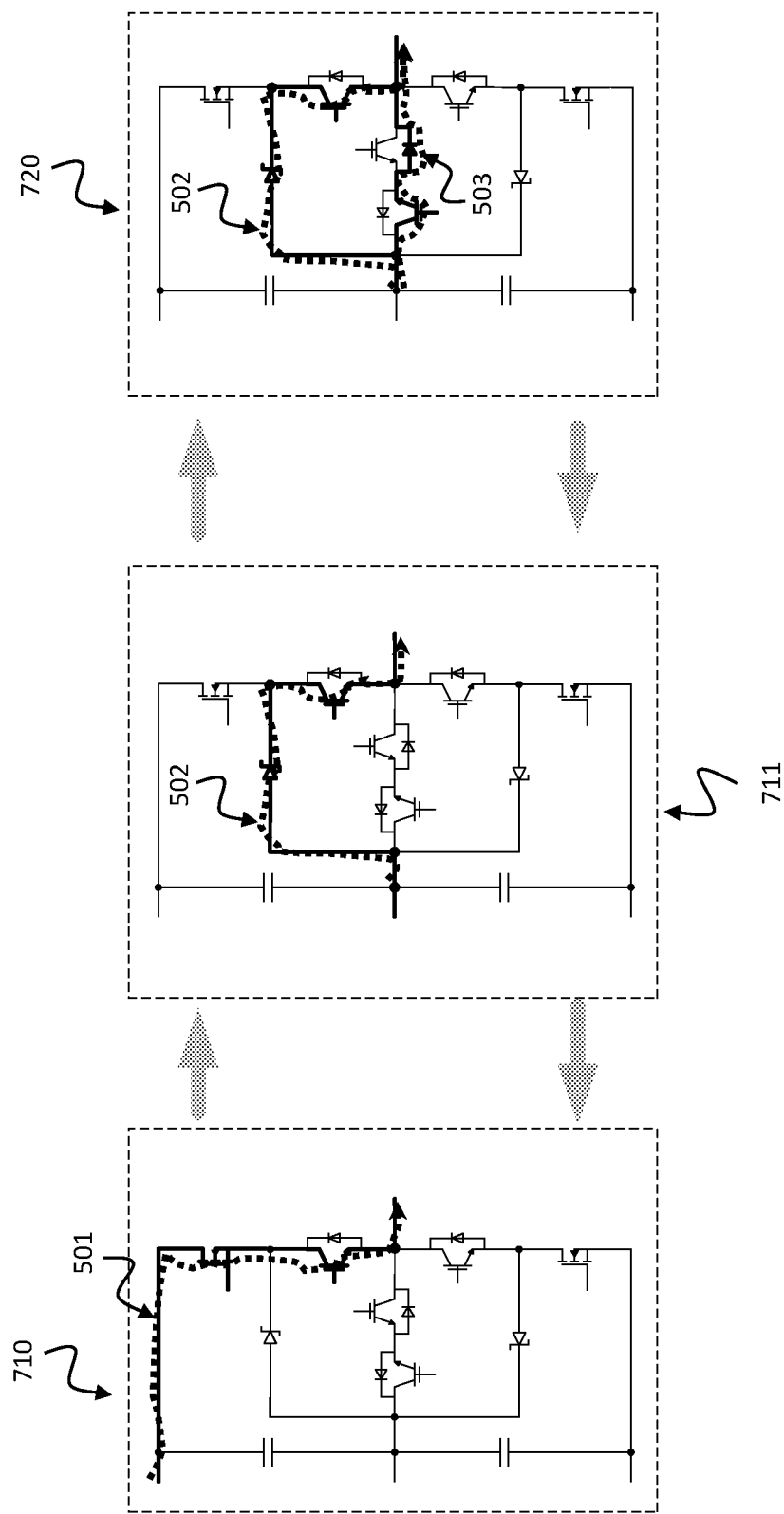
FIG. 7 shows a schematic diagram 700 illustrating exemplary states and state transitions of power converters.

FIG. 7 shows a schematic diagram 700 illustrating exemplary states and state transitions of power converters. These states and state transitions are exemplarily illustrated for the power converter 200 described in FIG. 2 but are also valid for the other power converters 100a, 100b, 300 described in FIGS. 1a, 1b and 3.

The power converter 200 is configured to switch the controllable switching circuit S1, S2, S3, S4, S5, S6 of the power converter 100a, 100b from a first state 710 in which the AC terminal 104 is switched to the first terminal 101 to a second state 720 in which the AC terminal 104 is switched to the third terminal 103 directly by establishing a conduction state that includes both, a first conduction path 502 through the first diode D7 and the second controllable unidirectional switch S2 of the first controllable unidirectional switching circuit S1, S2; and a second conduction path 503 through the controllable bidirectional switching circuit S5, S6.

The power converter 200 is configured to switch the controllable switching circuits S1, S2, S3, S4, S5, S6 of the power converter 200 from the second state 720 back to the first state 710 directly, or by passing through a first intermediate state 711.

In the first intermediate state 711, the first conduction path 502 is established from the third terminal 103 via the first diode D7 and the second controllable unidirectional switch S2 of the first controllable unidirectional switching circuit S1, S2 to the AC terminal 104.

In the second state 720, the first conduction path 502 is established from the third terminal 103 via the first diode D7 and the first controllable unidirectional switching circuit S1, S2 to the AC terminal 104 and additionally the second conduction path 503 is established from the third terminal 103 via the controllable bidirectional switching circuit S5, S6 to the AC terminal 104.

An analog switching sequence can be used to switch the connection of the output terminal 104 from the second DC voltage 102 to third DC voltage 103. This sequence using the complementary branches with respect to the ones used above. In this case being the connection of 103 to 104 established through diode D8 and switch S3 from the switching circuit S3, S4, and the bidirectional switch branch S5, S6. Additionally, in this case being the intermediate, optional, state for the sequence back from 103 to 102 the one establishing a current conduction path through diode D8 and switch S3 from the switching circuit S3, S4.

FIG. 7 presents a third operation method of the power converters 100a, 100b, 200, 300 described above with respect to FIGS. 1a, 1b, 2 and 3.

This third method the idea is to allow the two branches that can connect the neutral point to conduct in parallel such that the conduction losses can be lowered. The commutation process for the DCP to NS transition can be followed in FIG. 7. In this commutation method T5 is gated-on before T1 is turned off such that the bidirectional switch branch starts conduction (T5 turns on in ZVS condition). The main difference with the previous method 2 is that in this case T2 is not turned-off and is allowed to conduct during the complete NS.

When it is desired to change to the DCP state T1 can be turned-on again driving the diodes in the clamping branch D7 and the bidirectional switch branch D5 into blocking state. As this action would create some RR in D5 there is the possibility of first turning off T5 (in ZVS cond.) diverting all current to the clamping branch before turning on T1 (option 1-b in FIG. 7).

Figure 8:
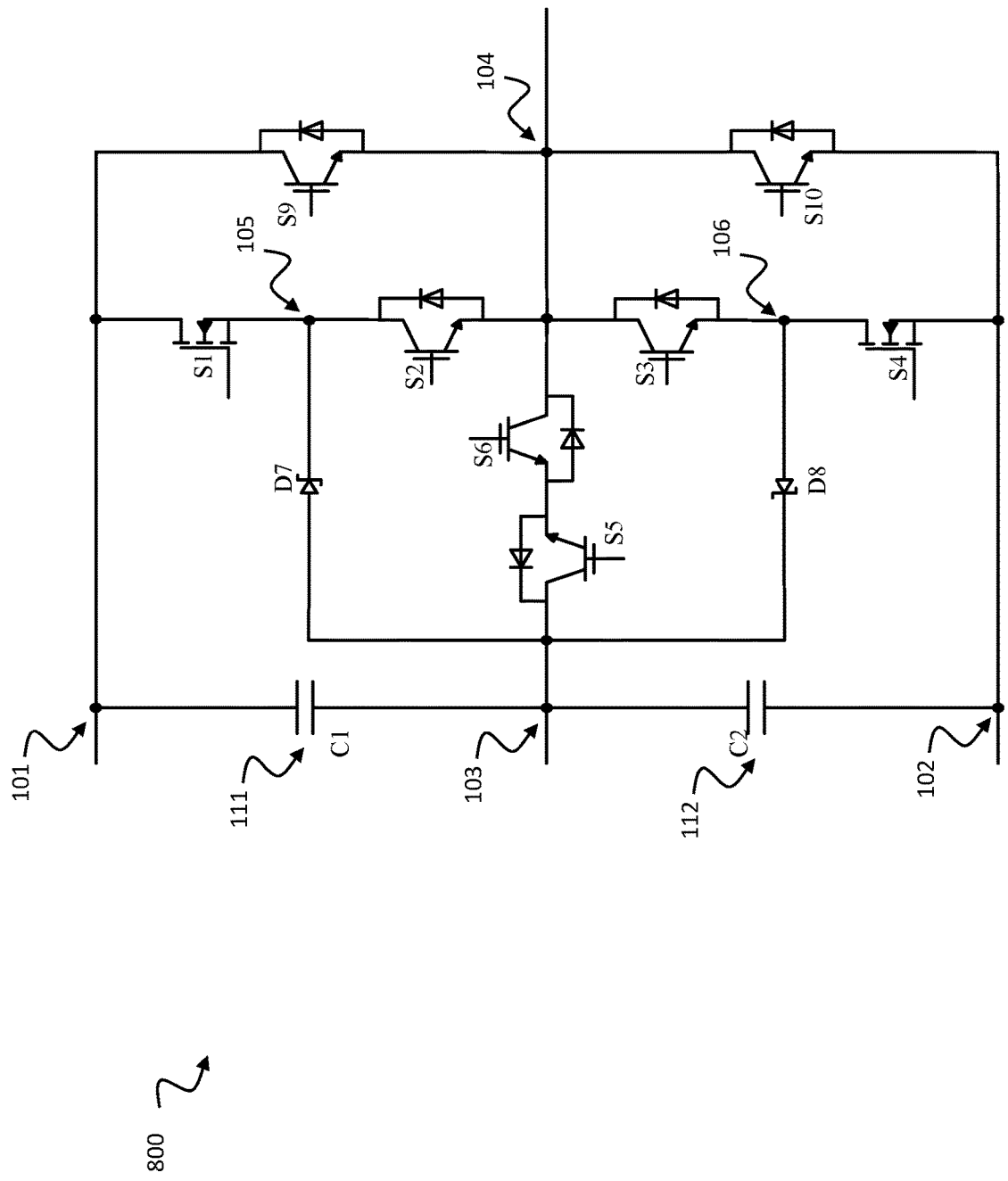
FIG. 8 shows a circuit diagram illustrating a fourth example of a power converter 800.

FIG. 8 shows a circuit diagram illustrating a fourth example of a power converter 800.

This power converter 800 corresponds to the power converter 300 shown in FIG. 3 with an additional circuitry described in the following. But the power converter 800 may also correspond to the power converters 100a, 100b, 200 shown in FIGS. 1a, 1b and 2 with the additional circuitry.

This additional circuitry includes a ninth controllable unidirectional switching circuit S9 connected in a forward current direction between the first terminal 101 and the AC terminal 104; and a tenth controllable unidirectional switching circuit S10 connected in a forward current direction between the AC terminal 104 and the second terminal 102.

Figure 9:
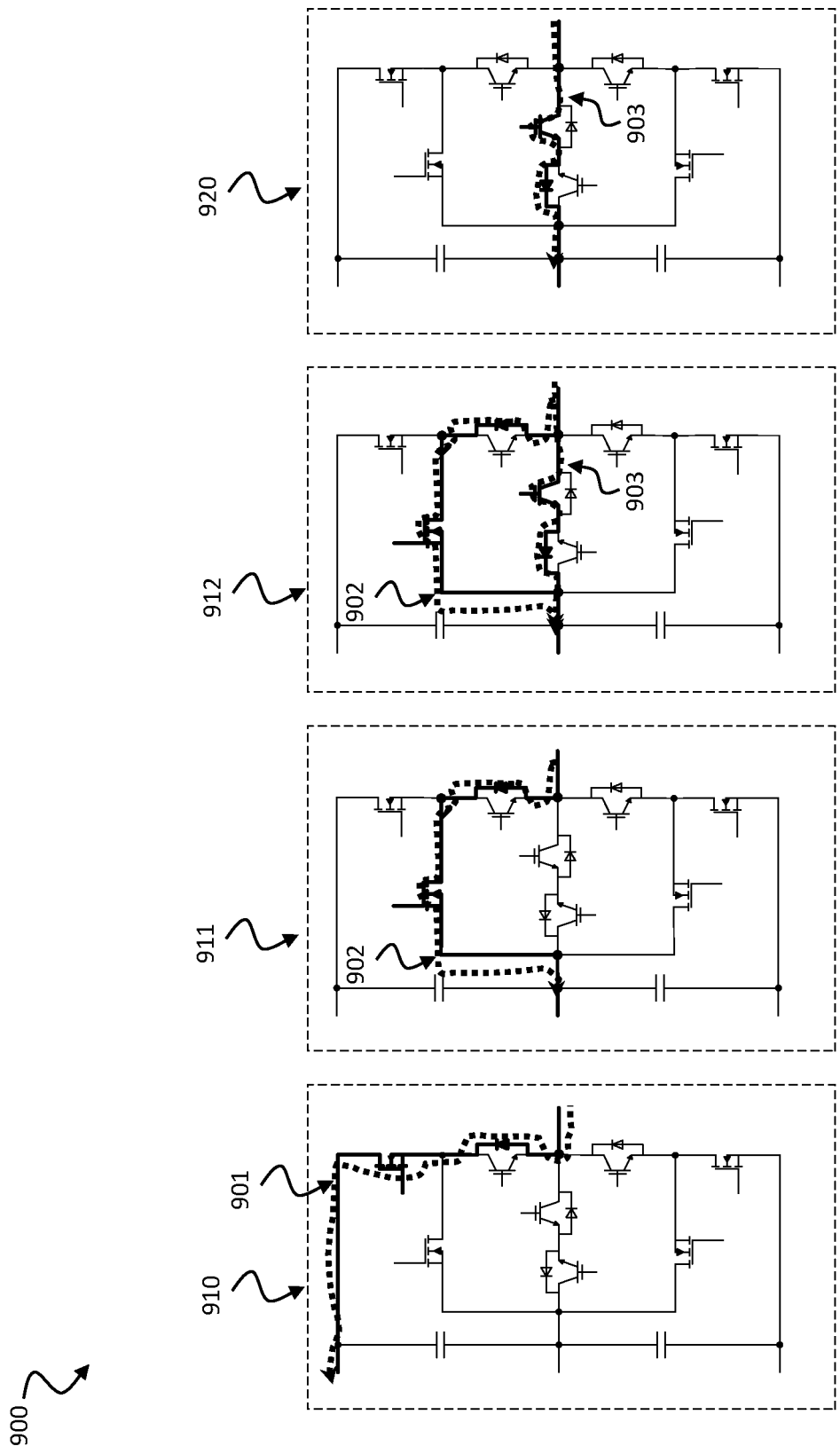
FIG. 9 shows a schematic diagram 900 illustrating exemplary states and state transitions of power converters.

FIG. 9 shows a schematic diagram 900 illustrating exemplary states and state transitions of power converters. These states and state transitions are exemplarily illustrated for a power converter similar to the power converter 300 described in FIG. 3 but for which a respective MOSFET transistor is connected either alone or in parallel to each of the diodes D7 and D8. Such a MOSFET transistor has internal "body diodes" that may provide the function of the freewheeling diode. The principles described by FIG. 9, however, are also valid for the power converters 100a, 100b, 200, 300 described in FIGS. 1a, 1b, 2 and 3.

The power converter is configured to switch the controllable switching circuits S1, S2, S3, S4, S5, S6, S7, S8 in order to switch the connection of the AC terminal 104 from the first terminal 101 in a first state 910 to the third terminal 103 in a second state 920 and back.

In this case the current flows 901, 902, 903 from the AC terminal 104 to the first and third terminals 101, 103. This change of states can be realized by passing through two intermediate states 911 and 912.

The first intermediate state 911 is configured to establish a current conduction path 902 through switching device S7 and diode D2 of the switching circuit S1, S2. And the second intermediate state 912 is configured to establish current conduction paths 902, 903 through both the bidirectional switch S5, S6 and the switching device S7 and diode D2 of the switching circuit S1, S2.

An analog switching sequence can be used to switch the connection of the AC terminal 104 from the second terminal 102 to the third terminal 103; with the current flowing from the AC terminal 104 to the second or third terminal 102, 103. Whereas in this case the complementary circuit branches to the ones described above are used to execute the connection change.

Figure 10:
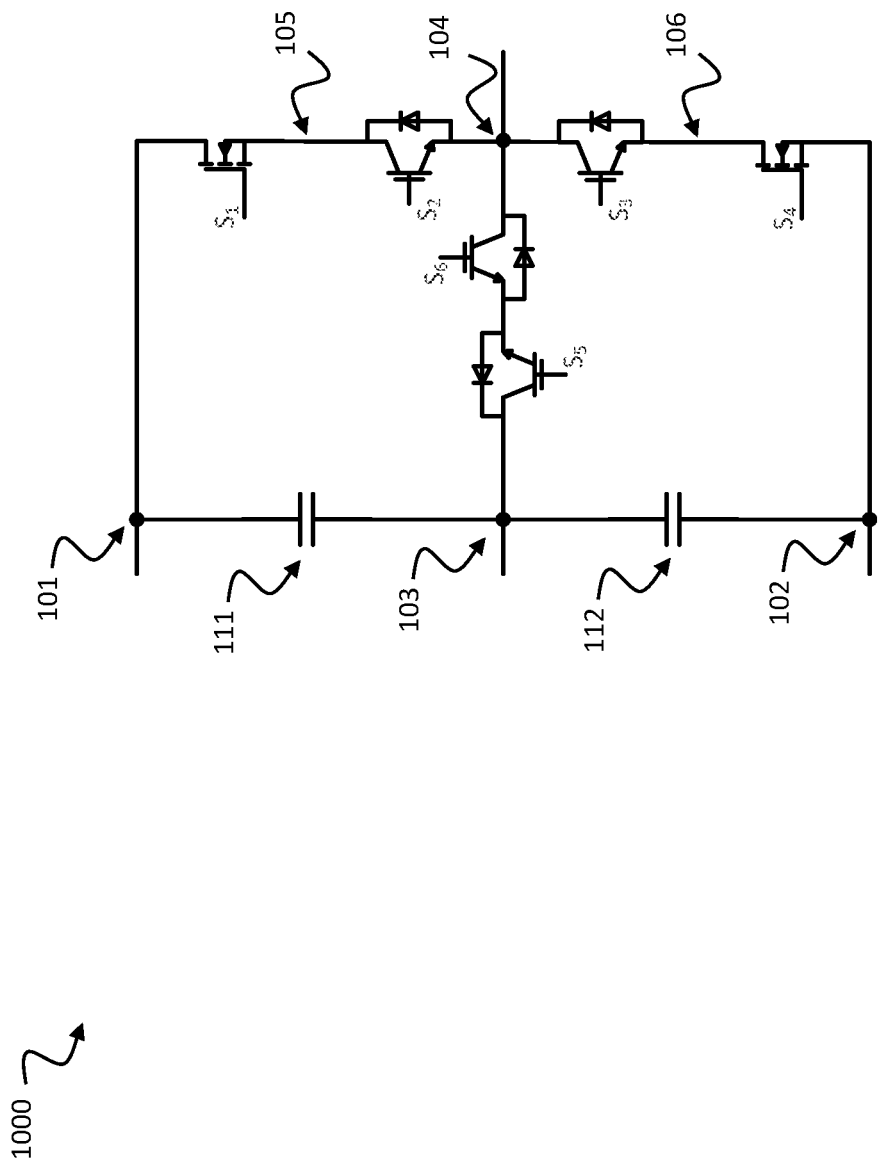
FIG. 10 shows a circuit diagram illustrating a fifth example of a power converter 1000.

FIG. 10 shows a circuit diagram illustrating a fifth example of a power converter 1000.

The power converter 1000 includes a first terminal 101 for coupling a positive terminal of a first DC voltage source 111.

The power converter 1000 includes a second terminal 102 for coupling a negative terminal of a second DC voltage source 112.

The power converter 1000 includes a third terminal 103 for coupling a negative terminal of the first DC voltage source 111 and a positive terminal of the second DC voltage source 112 to form a middle DC voltage.

The power converter 1000 includes an AC terminal 104 for coupling an AC voltage.

The power converter 1000 includes a first controllable unidirectional switching circuit S1, S2 connected in a forward current direction between the first terminal 101 and the AC voltage terminal 104. The first controllable unidirectional switching circuit S1, S2 is configured to switch the first terminal 101 to the AC terminal 104. The first controllable unidirectional switching circuit S1, S2 includes a first mid terminal 105 connecting a first S1 and a second S2 controllable unidirectional switch of the first controllable unidirectional switching circuit S1, S2.

The power converter 1000 includes a second controllable unidirectional switching circuit S3, S4 connected in a forward current direction between the AC terminal 104 and the second terminal 102. The second controllable unidirectional switching circuit S3, S4 is configured to switch the second terminal 102 to the AC terminal 104. The second controllable unidirectional switching circuit S3, S4 includes a second mid terminal 106 connecting a third S3 and a fourth S4 controllable unidirectional switch of the second controllable unidirectional switching circuit S3, S4.

The power converter 1000 includes a controllable bidirectional switching circuit S5, S6 connected between the third terminal 103 and the AC terminal 104. The controllable bidirectional switching circuit S5, S6 is configured to switch the third terminal 103 to the AC terminal 104.

The power converter 1000 may be implemented in correspondence to the power converter 300 shown above with respect to FIG. 3 but without the diodes D7 and D8.

Figure 11:
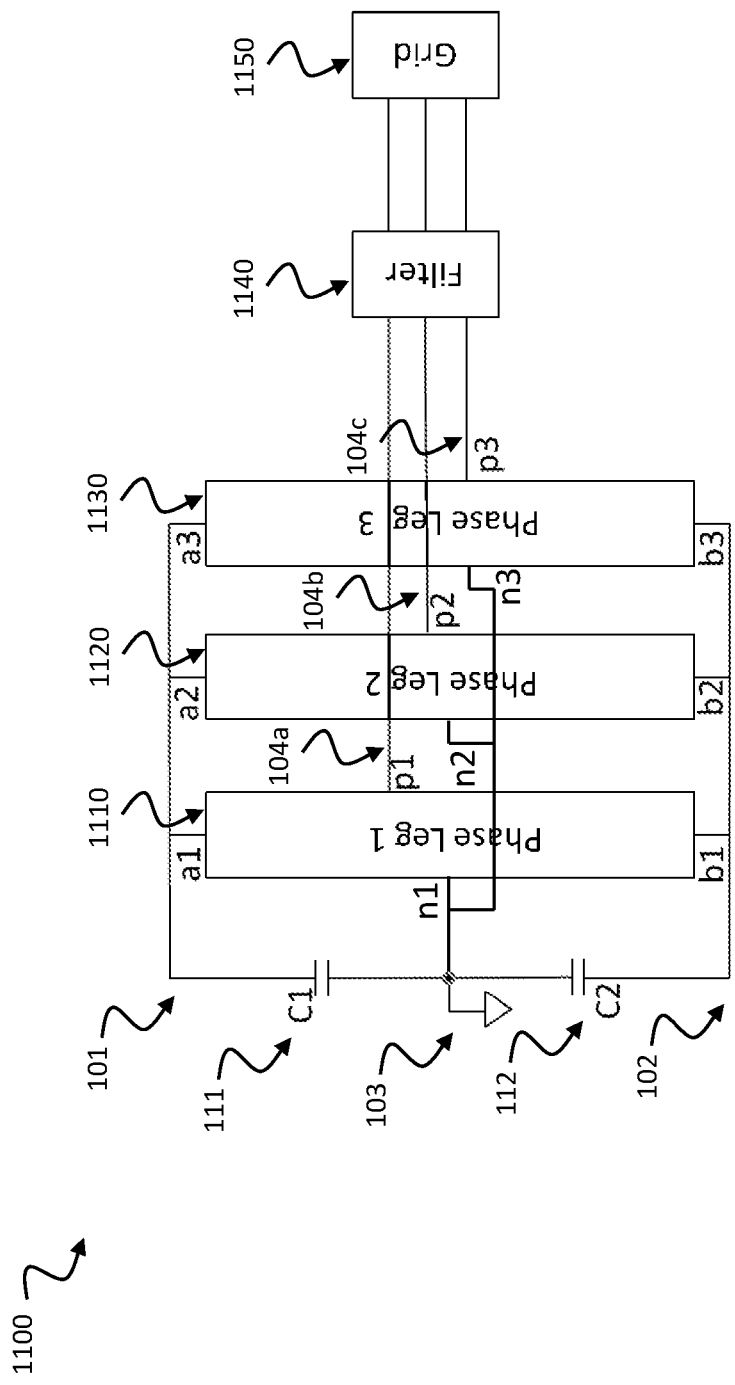
FIG. 11 shows a block diagram illustrating an exemplary structure of a three-phase converter for grid connection of a DC power source.

FIG. 11 shows a block diagram illustrating an exemplary structure of a three-phase converter 1100 for grid connection of a DC power source.

The three-phase converter 1100 includes a first terminal 101 for coupling a positive terminal of a first DC voltage source 111.

The three-phase converter 1100 includes a second terminal 102 for coupling a negative terminal of a second DC voltage source 112.

The three-phase converter 1100 includes a third terminal 103 for coupling a negative terminal of the first DC voltage source 111 and a positive terminal of the second DC voltage source 112 to form a middle DC voltage.

The three-phase converter 1100 includes a first AC terminal 104a for coupling a first phase AC voltage. A first phase leg 1110 is connected between the first, second and third terminals 101, 102, 103 and the first phase AC terminal 104a. The first phase leg 1110 may correspond to any of the circuit topologies described above with respect to FIGS. 1a, 1b, 2, 3, 8, 9 and 10.

The three-phase converter 1100 includes a second AC terminal 104b for coupling a second phase AC voltage. A second phase leg 1120 is connected between the first, second and third terminals 101, 102, 103 and the second phase AC terminal 104b. The second phase leg 1120 may correspond to any of the circuit topologies described above with respect to FIGS. 1a, 1b, 2, 3, 8, 9 and 10.

The three-phase converter 1100 includes a third AC terminal 104c for coupling a third phase AC voltage. A third phase leg 1130 is connected between the first, second and third terminals 101, 102, 103 and the third phase AC terminal 104c. The third phase leg 1130 may correspond to any of the circuit topologies described above with respect to FIGS. 1a, 1b, 2, 3, 8, 9 and 10.

The first, second and third AC terminals 104a, 104b, 104c are connected to a 3-phase filter 1140 and a 3-phase grid 1150.

While a particular feature or aspect may have been described with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in the embodiments, such terms are intended to be inclusive in a manner similar to the term "comprise". Also, the terms "exemplary", "for example," and "e.g." are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although aspects have been illustrated and described herein, it can be appreciated by those of ordinary skill in the art that a variety of alternate and/or equivalent implementations may be substituted for the aspects shown and described without departing from the scope of the embodiments. The embodiments cover any adaptations or variations of the aspects discussed herein.

Although the elements in the embodiments are recited in a particular sequence with corresponding labeling, unless the recitations otherwise imply a particular sequence for implementing some or all of those elements, those elements are not necessarily intended to be limited to being implemented in that particular sequence.

Many alternatives, modifications, and variations may be apparent to those skilled in the art in light of the above teachings. Of course, those skilled in the art readily recognize that there are numerous applications beyond those described herein. While described with reference to one or more particular embodiments, those skilled in the art recognize that many changes may be made thereto without departing from the scope of the embodiments and their equivalents.

The invention claimed is:

1. A power converter for voltage conversion comprising:
a first terminal configured to couple a positive terminal of a first DC voltage source;
a second terminal configured to couple a negative terminal of a second DC voltage source; and
a third terminal configured to couple a negative terminal of the first DC voltage source and a positive terminal of the second DC voltage source to form a middle DC voltage;
an AC terminal configured to couple an AC voltage;
a first controllable unidirectional switching circuit connected in a forward current direction between the first terminal and the AC voltage terminal, and configured to switch the first terminal to the AC terminal, wherein the first controllable unidirectional switching circuit comprises a first mid terminal connecting a first and a second controllable unidirectional switch of the first controllable unidirectional switching circuit;
a second controllable unidirectional switching circuit connected in a forward current direction between the AC terminal and the second terminal and configured to switch the second terminal to the AC terminal, wherein the second controllable unidirectional switching circuit comprises a second mid terminal connecting a third and a fourth controllable unidirectional switch of the second controllable unidirectional switching circuit;
a controllable bidirectional switching circuit connected between the third terminal and the AC terminal, the controllable bidirectional switching circuit being configured to switch the third terminal to the AC terminal;
a first diode connected in a forward current direction between the third terminal and the first controllable unidirectional switching circuit, wherein the first diode is configured to clamp the first mid terminal to the third terminal; and
a second diode connected in a forward current direction between the second controllable unidirectional switching circuit and the third terminal, wherein the second diode is configured to clamp the second mid terminal to the third terminal,
wherein the power converter is configured to switch the controllable switching circuits of the power converter from a first state in which the AC terminal is switched to the first terminal to a second state in which the AC terminal is switched to the third terminal by passing a first intermediate state and a second intermediate state;
wherein, in the first intermediate state:
a first conduction path is established from the third terminal via the first diode and the second controllable unidirectional switch of the first controllable unidirectional switching circuit to the AC terminal; and
in the second intermediate state:
the first conduction path is established from the third terminal via the first diode and the second controllable unidirectional switch of the first controllable unidirectional switching circuit to the AC terminal and;
a second conduction path is established from the third terminal via the controllable bidirectional switching circuit to the AC terminal,
wherein in the first state, the first and second controllable unidirectional switches are on and the controllable bidirectional switching circuit is off;
in the first intermediate state, the first controllable unidirectional switch is off, the second controllable unidirectional switch is on, and the controllable bidirectional switching circuit is off;

in the second intermediate state, the first controllable unidirectional switch is off, the second controllable unidirectional switch is on and the controllable bidirectional switching circuit is on; and in the second state, the first and second controllable unidirectional switches are off and the controllable bidirectional switching circuit is on.

2. The power converter of claim 1, further comprising:
a seventh unidirectional switch formed by the first diode; and
a first switching element connected in anti-parallel to the first diode, wherein the seventh unidirectional switch is configured to allow current flow between the first mid terminal and the third terminal.

3. The power converter of claim 2, further comprising:
an eighth unidirectional switch formed by the second diode; and
a second switching element connected in anti-parallel to the second diode, wherein the eighth unidirectional switch is configured to allow current flow between the third terminal and the second mid terminal.

4. The power converter of claim 2, wherein at least one of the first or second controllable unidirectional switching circuits comprises a switching element and a diode connected in anti-parallel to the switching element.

5. The power converter of claim 2, further configured to switch the controllable switching circuits in order to switch the connection of the AC terminal from the first terminal in a first state to the third terminal in a second state and back.

6. The power converter of claim 1, further comprising:
an eighth unidirectional switch formed by the second diode; and
a second switching element connected in anti-parallel to the second diode, wherein the eighth unidirectional switch is configured to allow current flow between the third terminal and the second mid terminal.

7. The power converter of claim 6, wherein at least one of the first or second controllable unidirectional switching circuits comprises a switching element and a diode connected in anti-parallel to the switching element.

8. The power converter of claim 1, wherein at least one of the first or second controllable unidirectional switching circuits comprises a switching element and a diode connected in anti-parallel to the switching element.

9. The power converter of claim 8, wherein the switching element comprises one of a MOSFET transistor, a bipolar transistor or a first insulated gate bipolar transistor and at least one of the first or second controllable unidirectional switching circuits comprises a second insulated gate bipolar transistor.

10. The power converter of claim 1, further configured to switch the controllable switching circuits of the power converter from the second state back to the first state by passing the second intermediate state and the first intermediate state.

11. The power converter of claim 1, further configured to:
switch the controllable switching circuits of the power converter from a first state in which the AC terminal is switched to the first terminal to a second state in which the AC terminal is switched to the third terminal by passing a first intermediate state; and
switch the controllable switching circuits of the power converter from the second state back to the first state by passing the first intermediate state or an optional second intermediate state.

12. The power converter of claim 11, wherein, in the first intermediate state,
a first conduction path is established from the third terminal via the first diode and the second controllable unidirectional switch of the first controllable unidirectional switching circuit to the AC terminal and
a second conduction path is established from the third terminal via the controllable bidirectional switching circuit to the AC terminal and, in the second intermediate state,
the first conduction path is established from the third terminal via the first diode and the second controllable unidirectional switch of the first controllable unidirectional switching circuit to the AC terminal.

13. The power converter of claim 1, configured to switch the controllable switching circuit of the power converter from a first state in which the AC terminal is switched to the first terminal to a second state in which the AC terminal is switched to the third terminal directly by establishing a conduction state that comprises:
a first conduction path through the first diode and the second controllable unidirectional switch of the first controllable unidirectional switching circuit; and
a second conduction path through the controllable bidirectional switching circuit; and configured to switch the controllable switching circuits of the power converter from the second state back to the first state either directly or by passing through a first intermediate state.

14. The power converter of claim 13, wherein, in the first intermediate state,
the first conduction path is established from the third terminal via the first diode and the second controllable unidirectional switch of the first controllable unidirectional switching circuit to the AC terminal.

15. The power converter of claim 13,
wherein in the second state,
the first conduction path is established from the third terminal via the first diode and the first controllable unidirectional switching circuit to the AC terminal and
the second conduction path is established from the third terminal via the controllable bidirectional switching circuit to the AC terminal.

16. The power converter of claim 1, wherein at least one of the first diode and the second diode comprise a Schottky barrier diode.

17. The power converter of claim 1, further comprising:
a ninth controllable unidirectional switching circuit connected in a forward current direction between the first terminal and the AC terminal; and
a tenth controllable unidirectional switching circuit connected in a forward current direction between the AC terminal and the second terminal.

18. A power converter for voltage conversion, comprising:
a first terminal configured to couple a positive terminal of a first DC voltage source;
a second terminal configured to couple a negative terminal of a second DC voltage source;
a third terminal configured to couple a negative terminal of the first DC voltage source and a positive terminal of the second DC voltage source to form a middle DC voltage;
an AC terminal configured to couple an AC voltage;
a first controllable unidirectional switching circuit connected in a forward current direction between the first terminal and the AC terminal, the first controllable unidirectional switching circuit being configured to switch the first terminal to the AC terminal, wherein the first controllable unidirectional switching circuit comprises a first mdi terminal connecting a first and a second controllable unidirectional switch of the first controllable unidirectional switching circuit;

a second controllable unidirectional switching circuit connected in a forward current direction between the AC terminal and the second terminal, the second controllable unidirectional switching circuit being configured to switch the second terminal to the AC terminal, wherein the second controllable unidirectional switching circuit comprises a second mid terminal connecting a third and a fourth controllable unidirectional switch of the second controllable unidirectional switching circuit;

a controllable bidirectional switching circuit connected between the third terminal and the AC terminal, the controllable bidirectional switching circuit being configured to switch the third terminal to the AC terminal;

a first diode connected in forward current direction between the third terminal and the first controllable unidirectional switching circuit, wherein the first diode is configured to clamp the first mid terminal to the third terminal; and a second diode connected in a forward current direction between the second controllable unidirectional switching circuit and the third terminal, wherein the second diode is configured to clamp the second mid terminal to the third terminal;

wherein the power converter is configured to switch the controllable switching circuits of the power converter from a first state in which the AC terminal is switched to a first terminal to a second state in which the AC terminal is switched to the third terminal by passing a first intermediate state; and the power converter is configured to switch the controllable switching circuits of the power converter from the second state back to the first state by passing the first intermediate state and a second intermediate state;

wherein in the first intermediate state, a first conduction path is established from the third terminal via the first diode and the second controllable unidirectional switch of the first controllable unidirectional switching circuit to the AC terminal and additionally a second conduction path is established from the third terminal via the controllable bidirectional switching circuit to the AC terminal; and in the second intermediate state, the first conduction path is established from the third terminal via the first diode and the second controllable unidirectional switch of the first controllable unidirectional switching circuit to the AC terminal;

wherein in the first state, the first and second controllable unidirectional switches are on and the controllable bidirectional switching circuit is off;

in the first intermediate state, the first controllable unidirectional switch is off, the second controllable unidirectional switch is on, and the controllable bidirectional switching circuit is off;

in the second intermediate state, the first controllable unidirectional switch is off, the second controllable unidirectional switch is on and the controllable bidirectional switching circuit is on; and in the second state, the first and second controllable unidirectional switches are off and the controllable bidirectional switching circuit is on.

\* \* \* \* \*